July 9, 1935.   E. C. DAMROW   2,007,422
CURD CUTTER
Filed Feb. 18, 1932
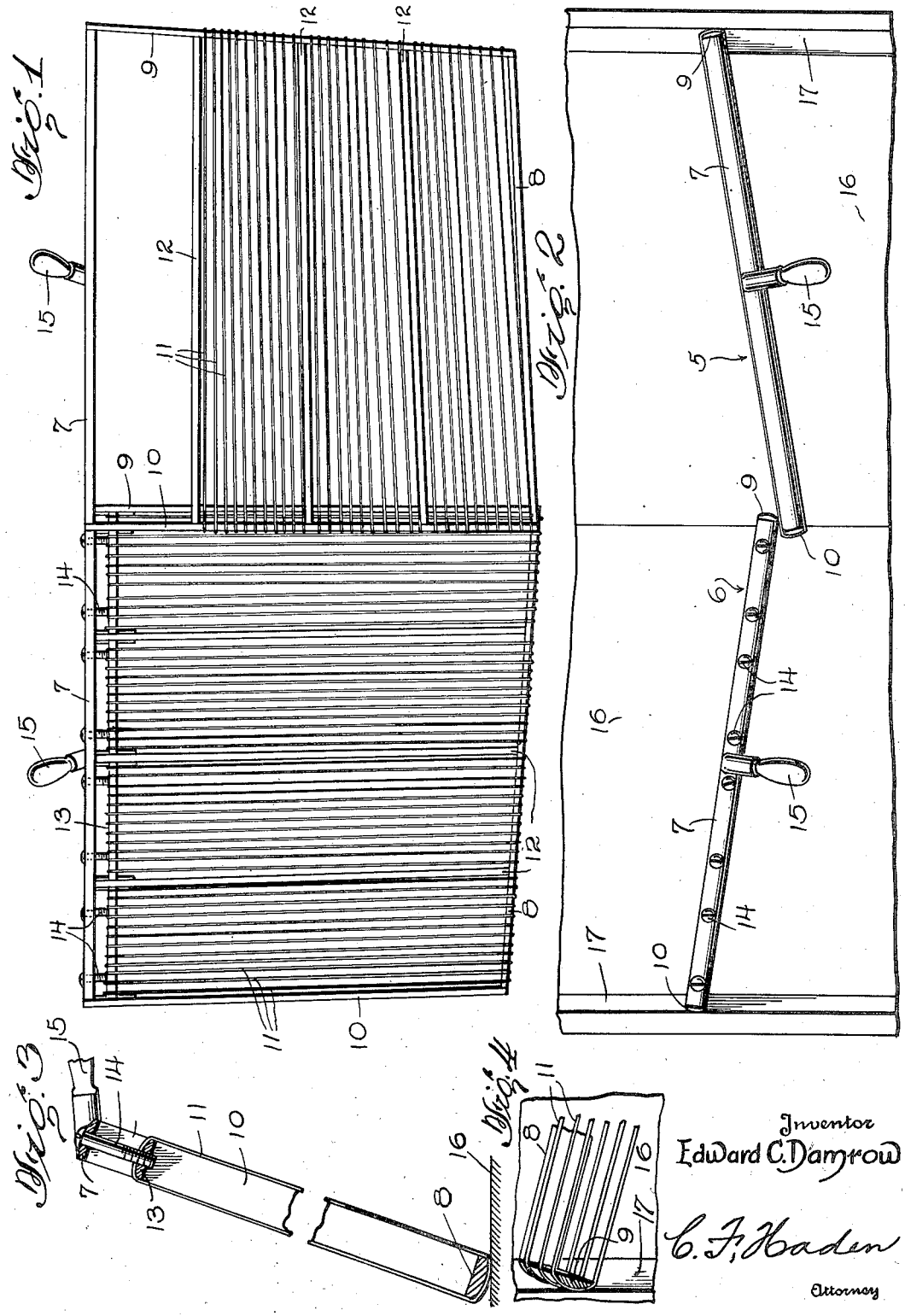
Inventor
Edward C. Damrow
C. F. Haden
Attorney

UNITED STATES PATENT OFFICE 2,007,422

CURD CUTTER

Edward C. Damrow, Fond du Lac, Wis.

Application February 18, 1932, Serial No. 593,824

1 Claim. (Cl. 31—48)

This invention pertains to the art of cheese making and has for its principal object a curd cutting process and device by which all the curd in a curd vat may be cut into slices of uniform thickness by a single passing of the curd cutter lengthwise of the vat; by a second passing of the cutter lengthwise of the vat all the curd is divided into string-like portions of substantially uniform cross-section, and by then drawing a section of the cutter transversely of the mass the string-like portions are separated into cubes of substantially uniform size. These steps in the art greatly augment the drainage of the whey from the curd and reduce the curd to such small and uniform portions that the subsequent step of cooking is equalized throughout the whole mass of curd.

In the drawing accompanying and made a part of this specification

Figure 1 shows an elevation of the curd cutter;

Fig. 2 shows a plan view of the curd cutting device of Fig. 1 and a portion of the curd vat with the cutter in operative position;

Fig. 3 shows a vertical section of the cutter in its position relative to the bottom of the vat when in use and illustrating the scraping action of the bottom bar on the bottom of the vat;

Fig. 4 shows a fragmentary view of the cutter to illustrate the scraping action on the sides of the vat when in use.

Throughout the specification and the drawing the same number is used to identify an element wherever it appears.

My improved curd cutter comprises a right hand section 5 and a left hand section 6 which must be co-operatively used to effect the desired steps of the desired system of curd cutting. Each section is composed of upper bar 7, lower bar 8, and side bars 9 and 10. The bars of each section are fixed together in any desired manner where they meet thus forming the corners of a substantially rectangular frame. An auxiliary bar may be used for adjusting purposes, designated 13, if desired. Cutting wires 11 extend from bar 13 to bar 8 of section 6 and from bar 9 to bar 10 of section 5. To provide for tensioning the cutting wires 11, I may use the auxiliary bar 13, which is adjustably suspended within the frame of section 6 by threaded bolts 14 which pass freely through bar 7 and engage co-operatively threaded perforations in bar 13. By this construction when bolts 14 are rotated, bar 13 will be moved towards or away from bar 7 thus tightening or loosening wires 11 as desired. To prevent distortion of the frames by the tension of the wires 11, bracing bars 12 are placed at spaced intervals to counteract the bending moment of the tensioning of wires 11.

A handle 15 of any desired length and shape is fixed to the upper bar 7 of each section and extends like a rake handle at any desired angle therefrom.

In operation sections 5 and 6 are positioned as shown in Fig. 2 resting upon the bottom 16 of the vat and in contact with sides 17 of the vat. A workman grasps a handle 15 and his assistant grasps the other handle 15, whereupon they drag the cutter from one end of the vat to the other end of the vat thereby dividing the entire mass of curd into slices of uniform thickness by one passing of the cutter through the contents of the vat. Half of the curd will be divided into vertical slices by section 6 and the other half will be divided into horizontal slices by section 5.

After dividing the curd into slices as explained, the workman and his assistant exchange sections of the cutter or keep the same sections of the cutter and exchange sides of the vat as desired and drag the cutter lengthwise of the vat in the opposite direction.

By these two passages lengthwise of the vat the whole mass of the curd is operated upon once by each section of the cutter and the mass of curd is left in string-like portions of substantially uniform rectangular cross-section, thus facilitating the drainage of the whey and uniformity in the subsequent cooking step.

Drainage and uniformity of cooking can be further insured by passing section 6 transversely once through all portions of the string-like mass of curd, which divides the curd into cubical portions of substantially uniform size.

Having fully described my improved curd cutter and the mode of operating it, I claim:

A two-piece curd cutter, the combined width of the associated parts of which, when in operative relation, is somewhat greater than the inside width of the curd containing vat with which the cutter is to be used, each part of the cutter having a marginal frame made of material plano-convex in cross-section, the convex faces of the frame being disposed outwardly, and the contour of the frame conforming in shape substantially with one-half the transverse cross section of the said vat, and cutting wires extending from one side of the frame to the opposite side of the frame, whereby when the top of the cutter is tipped forward and the overlapping ends in the longitudinal center of the vat are moved lengthwise of the vat in advance of the ends in contact with the sides of the vat the meeting edge of the plane and the convex faces of the frame material contact with the interior surfaces of the sides and the bottom of the vat and efficiently scrape the curd therefrom simultaneously with the cutting of the curd by the wires.

EDWARD C. DAMROW.